June 13, 1967 J. D. McHUGH 3,324,970
SELF-CONTAINED VISCOUS PUMP LUBRICATION SYSTEM
Filed June 26, 1964 2 Sheets-Sheet 1
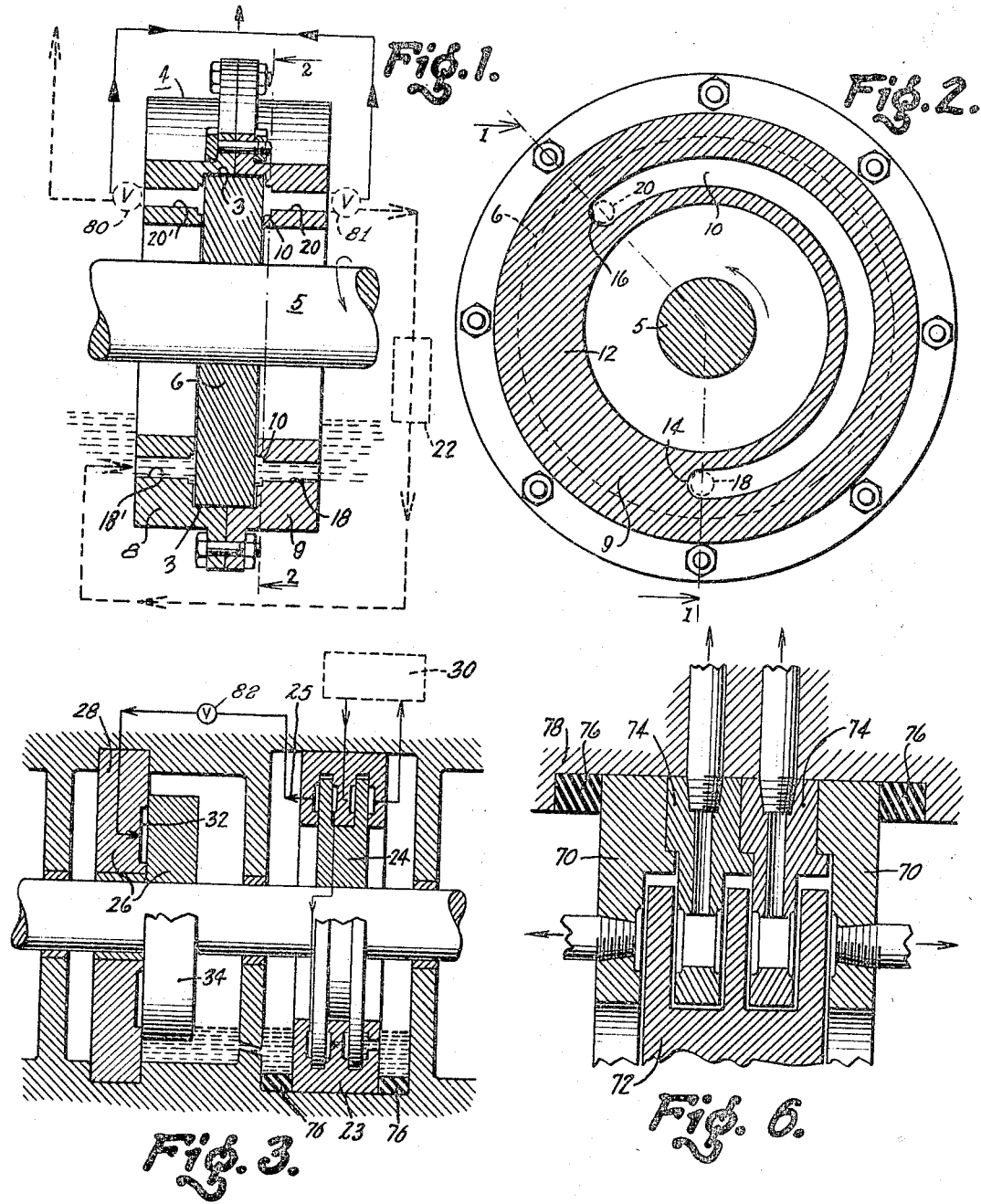
Inventor:
James D. McHugh
by Paul G. Frank
His Attorney June 13, 1967  J. D. McHUGH  3,324,970
SELF-CONTAINED VISCOUS PUMP LUBRICATION SYSTEM
Filed June 26, 1964  2 Sheets-Sheet 2

Inventor:
James D. McHugh
by Paul A. Frank
His Attorney ated June 13, 1967

United States Patent Office 3,324,970
Patented June 13, 1967

3,324,970
SELF-CONTAINED VISCOUS PUMP
LUBRICATION SYSTEM
James D. McHugh, Schenectady, N.Y., assignor to General Electric Company, a corporation of New York
Filed June 26, 1964, Ser. No. 378,172
8 Claims. (Cl. 184—6)

My application relates to lubrication systems, and more particularly, to a self-contained high pressure lubrication system.

With the present rapid advance in technology, new applications are creating a trend toward operation of integral or self-contained systems wherein the area in which the system is to operate is under a critical limitation as to space. In these applications, it is advantageous to have lubrication systems that operate as self-contained compact units, without the necessity of equipment exterior to the system. Applications also exist in high pressure and high temperature environments where the use of sealed integral equipment is essential to proper operation of the system.

The generation of high pressures with conventional viscous drag lubricant pumping means requires extensive operating areas, since only the outer periphery of the rotating part of the pump is employed in generating this pressure. An example of such a pump is the Kingsbury oil ring type which requires a large peripheral surface area to provide adequate flow at high pressures. Use of such pumps in limited availability areas, thus becomes impossible. Various other pumps have been designed for areas where space is a critical factor, but are unable to generate the requisite high pressures, due to losses in their intricate pumping channels.

In a self-contained lubrication system the necessity arises to provide a bearing, within the same system, which is lubricated by the output of the pump without requiring equipment exterior to the system. An integral system such as this to be adaptable for high pressure operation, where space limitations prevail, necessitates that the pump be capable of supplying a high pressure output while operating efficiently in a minimum of space.

The chief object of my invention is to provide a high pressure viscous drag pump capable of operation in areas where space is a critical factor.

Another object of my invention is to provide a self-contained lubrication system where the output of a pump supplies the lubricant to a bearing within the same system.

Another object of my invention is to provide a self-contained lubrication system where the pump itself acts as a bearing.

Another object of my invention is to provide a pump which is staged to increase its pressure capabilities.

Another object of my invention is to provide a pump that employs the side faces of its rotating member to achieve maximum pressure capabilities.

Another object of my invention is to provide means for easily adjusting the clearance tolerances of a pump.

A still further object of my invention is to provide means for compensating slight operating variations in the position of the rotating member of the pump to reduce frictional wear.

These and other objects of my invention will be more readily apparent from the following description.

One of the features of my invention is a provision of a self-contained lubrication system whereby a high pressure pump employing the faces of the pumping parts, perpendicular to the direction of rotation, imparts a requisite pressure to a lubricant, which is then transmitted to a thrust bearing within the same system.

In brief, my invention is a viscous drag pump in which a rotating member is interposed between interior faces of a stationary member. Each stationary member face has an annular channel (in its face) and an orifice at each end of the channel with a passageway extending from each orifice to the exterior of the stationary member. Suitable valving in the lines exterior to the stationary member allows the output from each side of the rotating member to be fed in series or parallel so that greater pressure or more flow will result. By suitable connections the rotating member may be made self-lubricating.

The attached drawing illustrates preferred embodiments of the invention in which:

FIGURE 1 is a sectional view of the pump embodying my invention taken along line 1—1 of FIGURE 2.

FIGURE 2 is a sectional view of the pump shown in FIGURE 1 taken along line 2—2.

FIGURE 3 is a sectional view of the self-contained lubrication system showing the pump and bearing.

FIGURE 6 is a view of a modification of the stationary pumping ring of the pump of FIGURE 1.

Figure 4:
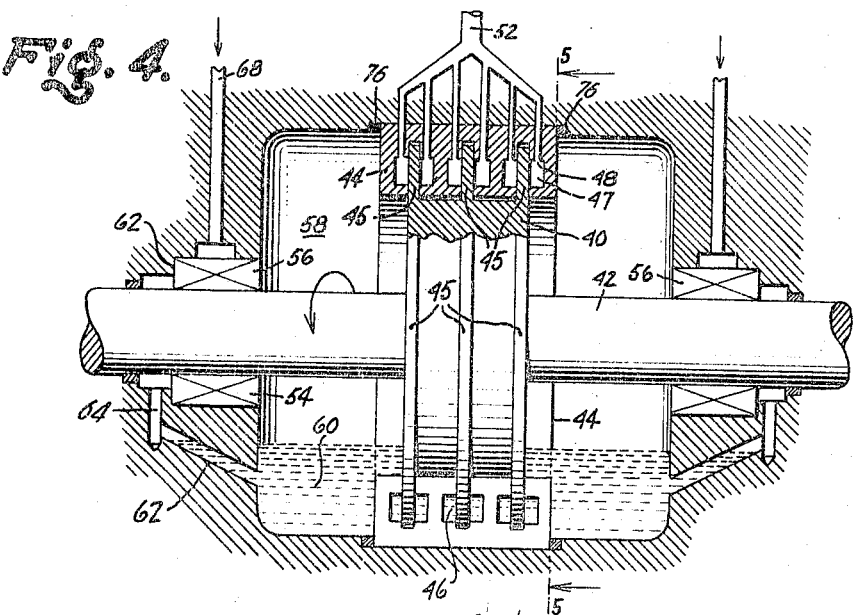
FIGURE 4 is a sectional view of a modification of the pump of my invention taken along line 4—4 of FIGURE 5.

In FIGURE 1, there is shown a sectional view of the viscous pump embodying the present invention. The construction includes rotating collar 6 affixed to drive shaft 5 to rotate with it. Surrounding collar 6 is stationary ring or disc 4 consisting of two halves 8 and 9 joined together by suitable fastening means i.e., nuts and bolts. These halves of the stationary ring form U-shaped depression or channel 3 in which the rotating collar revolves. A C-shaped nonconverging pumping groove or channel 10 is formed on each half of the stationary ring, on its interior side, proximate the rotating collar. Through these channels which are shallow in depth, the lubricant is directed, thereby imparting to it the desired pressure. Channels 10 may vary in length from almost a full circle to a small sector thereof depending upon the distance through which it is desired to carry the lubricant and depending on the pressures desired to be achieved.

Positioned at the discharge end of pumping groove 10 is a solid section of material, integral with the stationary ring, forming dam 12. The lubricant travels in pumping channel 10 from end 14, where entrance orifice 18 is located, to other end 16 of the channel where exit orifice 20 is located. These entrance and exit orifices extend through the stationary ring, and then are directed in any manner as desired with either flexible or rigid tubing. Alternatively, channel 10 is left open to communicate with the lubricant bath, as shown in FIGURE 6 and as will be subsequently described.

In operation, the oil enters orifices 14 and travels into pumping channels 10 on each side of stationary disc 4. The revolution of rotating collar 6, driven by shaft 5, at the desired speed, causes a viscous drag force on the lubricant directing it to flow from inlet point 18 around the length of the pumping groove and out discharge point 20. Because of the close tolerances between the rotating collar and the stationary disc, the oil in the pumping groove travels no further than the dam, and is thus forced out exit orifice 20. The pressurized lubricant is then transmitted out the discharge orifices and to the desired locations. Thus, by controlling the length of the pumping groove, the desired pressure is imparted to the lubricant.

The phantom lines in FIGURE 1 indicate a modification of the pump of FIGURE 1 in which the pumping grooves are in a series arrangement, instead of the parallel arrangement of the previously mentioned form of FIGURE 1, to achieve higher pressures. The lubricant enters intake port 18 in the same way as in the pump of FIG- URE 1, and is directed through pumping groove 10 and discharged out exit orifice 20. From there, the lubricant is transmitted to the second stage pumping groove by being passed into inlet orifice 18' in the other half of stationary disc 4. The lubricant is then directed by the viscous drag forces caused by the revolution of rotating collar 6 the outer annulus of which is the impelling fin, through pumping channel 10 to exit orifice 20' in side 8 of the stationary ring. From this outlet point 20', the lubricant is then transmitted to the desired part to be lubricated. By being transmitted through both sides of the pump, the pressure imparted to the lubricant is much greater than where it is simply pressurized by traveling through one half of the stationary disc. If desired, intercooler 22 is placed between outlet 20 of the first stage of the pump and inlet 18' of the second stage to cool the lubricant and thereby achieve greater pressures.

Further, FIGURE 1 illustrates means for employing the pump of my invention as a combination pump and thrust bearing. By closing exit ports 20 and 20' in the parallel flow mode of FIGURE 1 (the solid lines) by a suitable closure e.g., a valve 80, 81 or plug, the lubricant entrained within pumping channels 10 remains there. The pressure which this lubricant is under remains high due to the continued rotation of rotating collar 6 and the fin trying to force more lubricant into channel 10. In operation, when an outside force is applied to either end of shaft 5, the pressurized lubricant in the channel 10 opposite the side to which the force is applied causes a diametrically opposite restoring force on rotating collar 6, thus on shaft 5 to impart the proper bearing function to the shaft.

In the series arrangement (shown by the dashed lines) in FIGURE 1, only the ultimate exit port 20' is sealed, this in turn, because of the series arrangement, will result in the pressurization of channels 10 on both sides of rotating collar 6. As with the prior parallel mode of FIGURE 1, this pressurization will impart the proper bearing function to the shaft. This description is based on a single finned pump, but this is not to be construed as a limitation, since the results will be equally as good with multiple finned pumps.

FIGURE 3 illustrates a self-contained lubrication system embodying the present invention. This includes a viscous pump 24 in combination with a bearing 26 to which the lubricant is supplied by the pump. This pump includes stationary disc 23 and rotating collar 24 which in the particular mode illustrated contains four pumping grooves for increased pressure capabilities. Staging is employed in the pump illustrated to achieve these high pressure potentials, but is not to be construed as a limitation in this particular system. As previously mentioned with staging, the lubricant will travel from the outlet of one pumping groove to the inlet of the next and so on, thereby increasing the pressurization of the lubricant as it passes through each subsequent pumping channel; in a similar fashion to that of the modified form of FIGURE 1. As priorly mentioned, an intercooler 30 may be used between the various stages to aid in achieving this increased pressure. In this system the lubricant is transmitted by a pump to thrust bearing 26 within the same system. This thrust bearing consists of cylindrical bearing block 28 having circular channel 32 in its face through which the lubricant flows. The pressurized lubricant pumped into channel 32 creates the requisite pressure to keep bearing rotor 34 at a sufficient distance from the bearing block to insure a proper bearing function. The pump of this system need not be staged as illustrated. Valve 82 can close the exit port at 25 with similar result to closing valves 81, 82 of FIGURE 1. It may be the pump of either FIGURE 1, or the modified form of FIGURE 1, or the pump shown in this figure, or any other embodiment of the pump of my invention. It will be appreciated that the various pumps embodying this invention, when used in combination with the thrust bearing achieve a system obtaining a maximum pressure in a minimum of space without the necessity of parts external to the system.

The various staging arrangements for the pumps of this invention result in a significant increase in pressure with a very slight, if any, increase in space. The staging used and the length of the pumping grooves through which the lubricant travels is dependent on the pressures desired for the particular application envisioned. It is significant that the various staging arrangements do not require the usual space taken up by viscous drag pumps seeking to achieve commensurate pressures. The pump of this invention accomplishes its pressurizing between the sides of the rotating member of the pump and the stationary member and not along its periphery. This takes advantage of the fact that the sides of the rotating member of the pump generate a space that is not controlled by the width of this rotating member. Therefore, the space taken up by the pump of this invention is kept at a bare minimum and does not increase significantly even with staging arrangements. The amount of space in which the lubricant travels is not controlled by the width of either the rotating member or the stationary member of the pump but simply by the amount of fins in the rotating member. This provides possibilities for greatly increasing pumping pressure without a corresponding increase in useful area.

Figure 5:
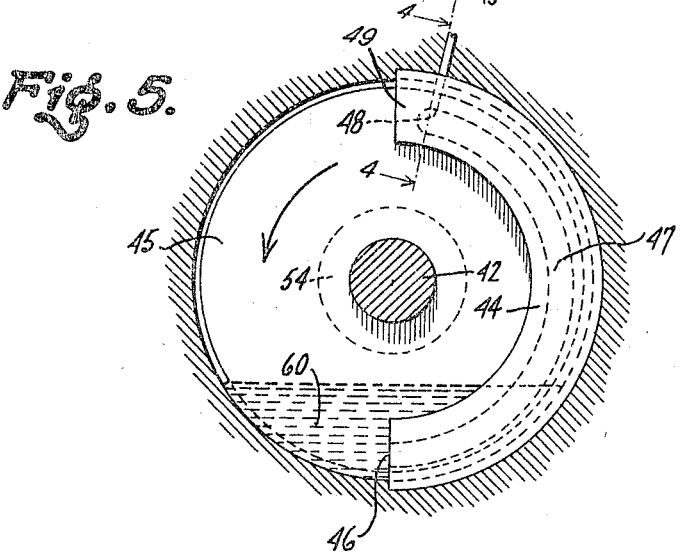
FIGURE 5 is a sectional view of the pump shown in FIGURE 4 taken along line 5—5.

FIGURE 4 illustrates a sectional view of a modified form of the pump of my invention. The construction of this pump includes rotating collar 40, similar to the rotating collar of FIGURES 1 and 4, driven by rotating shaft 42 which causes the collar to rotate inside stationary ring 44 as in the aforementioned modes of the present invention. Stationary ring 44 in this modification of my invention is only a partial ring encompassing only the length of pumping groove 47 and dam 49. This is in contrast with stationary pumping ring 4 of the mode of FIGURE 1, where a complete circular ring is employed regardless of the length of pumping groove 10. As illustrated in FIGURE 5, the oil, being at a level above entry point 46 of stationary ring 44, will be dragged into pumping groove 47, by a viscous drag effect, as previously discussed, caused by the rotation of rotating collar 40 in contact with the lubricant. The rotating collar as it rotates through the oil sump draws oil into entry point 46 of pumping groove 47. In the same manner as with the prior modes of this invention, lubricant is pumped by this viscous drag effect through pumping groove 47 and out exit port 48, which is in proximity with dam 49. This then permits the lubricant to be directed as desired.

In FIGURE 4, the various exit ports are all directed to a single main exit tube 52 which then redirects the lubricant where desired. The rotating collar illustrated in FIGURE 4 contains three fins 45 which provide for a larger volume operation at the same high pressure as a single fin by providing thrice the pumping channel area. The amount of fins on the rotating collar shown in the illustration is not to be construed as a limitation, since the amount of fins used is determined by the volume flow desired and the other variables of the system. Neither is a single exit a limitation, since there may be a plurality, also depending on the requirements of the system.

Bearings 54 illustrated in FIGURE 4 are supplied with a lubricant, which after its use by the bearings is discharged on both sides thereof. The discharge on side 56 towards the pump flows into pump opening 58 and into sump 60, whereas the discharge on the opposite side 62 of the bearing flows through pipe 64 into pipe 66 and into sump 60. The lubricant used by the bearing is then returned to the pump to be redirected back into the same system through oil entry port 68 of the bearing, thereby achieving a self-contained pump bearing lubrication system. Alternatively, the lubricant may be pumped to an intercooler and a reservoir, to be reused in the same system or elsewhere as desired.

It will be appreciated that the adjustment of stationary ring 70 with respect to rotating collar 72 may be easily accomplished as illustrated in FIGURE 6. Separable parts 74 of stationary ring 70 may be moved with respect to the remainder of the stationary ring, and the rotating collar to be properly positioned with respect thereto. These can be easily shimmed and bolted together to give the desired small clearances between the rotating collar and the edges of the stationary ring. The simplicity of movement of these separable parts of the stationary ring obviates the need for intricate machining operations to achieve the clearances desired.

Further in the modification illustrated in FIGURE 6, there is provision for compensation of axial movement of the rotating collar. Axial movement, without any provision to compensate for it, would tend to cause damaging rubbing contact between the rotating collar and the stationary ring. The provision of flexible positioners 76 between stationary ring 70 and base 78 to which it is affixed will permit the stationary ring to move in accordance with the movements of the rotating collar and thereby prevent this damaging wear between the parts. In operation, when the rotating collar is displaced axially, to one side or the other, the clearance between rotating collar 72 and stationary ring 70 is reduced on one side. This increases the pressure between that end face of the rotating collar and the stationary ring. Conversely, it decreases the pressure on the opposite face of the rotating collar and the stationary ring in proximity therewith. The resulting force on the stationary ring will be in the same direction as this axial motion of the rotating collar, which because of the flexibility of the axial positioners, will center the stationary ring with respect to the rotating collar. These axial positioners may embody any resilient flexible material such as rubber or plastic, their resiliency being determined by the pressures and quantities of lubricant being pumped and also by the weight and size of the various parts. These positioners are also shown by numeral 76 in FIGURE 4.

It will be appreciated that there are at least two pumping grooves to supply two lubricant streams to different areas requiring lubrication.

The pump and self-contained lubrication system embodied in my invention takes advantage of the vertical surfaces of the pump thereby achieving the greatest useful pumping area without any substantial increase in useful space.

It is now apparent that my invention attains the objectives set forth. It effectively solves the problem of having a high pressure lubrication system which is self-contained whereby the output of the pump supplies lubrication to a bearing within the same system without resort to equipment exterior thereto.

While I have described certain specific embodiments of my invention, I wish it to be understood that I desire to protect in the following claims all changes and modifications thereto which fall within the scope and spirit of these claims.

What I claim as new and desire to secure by Letters Patent of the United States is:

1. A viscous drag pump comprising:
   a stationary member having interior faces with channels therein for the transmission of a lubricant with an entrance and exit orifice forming passageways in said member from said channel to the exterior of said member at opposite ends of each channel whereby the channels are adapted to be connected in parallel or in series with each other, and
   a rotating member, interposed between said interior faces of said stationary member and having faces in juxtaposition with said channels for pressurizing the lubricant in said channels.

2. A viscous drag pump comprising:
   a stationary member having a pair of interior faces, each having a lubricant pumping channel therein with an entrance and exit orifice in each channel at opposing ends of said channel forming passageways in said member from said channel to the exterior of said member whereby the channels are adapted to be connected in parallel or in series with each other,
   a rotating member, interposed between said interior faces of said stationary member and having faces in juxtaposition with said channels for pressurizing the lubricant, and
   means connecting said exit of one lubricant pumping channel with said entrance of the other lubricant pumping channel for pressurizing the lubricant in all the pumping channels to increase the pressure thereof.

3. A viscous drag pump comprising:
   a stationary member having a plurality of depressions defining a plurality of interior faces with channels each having spaced entrance and exit orifices for the transmission of a lubricant, said channels having an entrance orifice and an exit orifice at spaced points in each of said channels, and passageways extending from said orifices to the exterior of said stationary member whereby the channels are adapted to be connected either in parallel or in series with each other,
   a rotating member having fins interposed between said interior faces of the stationary member said fins having faces in juxtaposition with said channels for pressurizing the lubricant.

4. A viscous drag pump comprising:
   a stationary member having interior faces with nonconverging channels therein for the transmission of a lubricant, each of said channels having orifices at each end and passageways formed in said stationary member and extending from each orifice to the exterior of said stationary member whereby the channels are adapted to be connected in parallel or in series with each other,
   a rotating member interposed between said interior faces of said stationary member and having faces in juxtaposition with said channels for pressurizing the lubricant, and
   axial positioners attached to said stationary member for maintaining the alignment of said stationary member with respect to said rotating member.

5. A viscous drag pump as recited in claim 1 wherein said stationary member comprises separable parts for aligning said member with respect to said rotating member.

6. A viscous drag pump comprising:
   a stationary member having partially circular interior faces with nonconverging partially circular lubricant pumping channels therein for the transmission of a lubricant, spaced entrance orifice and exit orifices located in each channel each forming a passageway in said stationary member to the exterior of said member whereby the channels are adapted to be connected in parallel or in series with each other, and
   a rotating member, interposed between said interior faces of said stationary member and having faces in juxtaposition with said channels, for pressurizing the lubricant by a viscous drag effect.

7. A combination lubrication pump and bearing comprising:
   a stationary member having interior faces with lubricant pumping channels one in each interior face therein having entrance and exit orifices located one at each end of each said channel and said member having passageways formed in said member connecting the orifice to the exterior thereof,
   a rotating member, interposed between said interior faces of said stationary member and having faces in juxtaposition with said channels for pressurizing the lubricant, and
   means for closing said exit orifices whereby the entrained lubricant in said pumping channels imparts a bearing function to said rotating member.

8. A combination lubrication pump and bearing comprising:
- a stationary member having a pair of interior faces each having a lubricant pumping channel therein with an entrance and exit orifice thereto located at opposite ends of said channel and connected to the exterior of said housing,
- a rotating member, interposed between said interior faces of said stationary member and having faces in juxtaposition with said channels,
- means connecting said exit of one lubricant pumping channel with said entrance of the other lubricant pumping channel for pressurizing the lubricant in all the pumping channels to increase the pressure thereof, and
- means for closing said other exit orifice whereby the entrained lubricant in said pumping channels imparts a bearing function to said rotating member.

References Cited
UNITED STATES PATENTS

| | | | |
|---|---|---|---|
| 1,069,408 | 8/1913 | Gaede | 103—84 X |
| 2,362,644 | 11/1944 | Lemmon et al. | 184—6 |

FOREIGN PATENTS

| | | |
|---|---|---|
| 285,335 | 2/1928 | Great Britain. |
| 336,001 | 10/1930 | Great Britain. |
| 899,663 | 6/1962 | Great Britain. |

OTHER REFERENCES

Seward, H. L.: Marine Engineering, N.Y., S.N.A.M.E., 1944, vol. 2, p. 207, Fig. 4.

LAVERNE D. GEIGER, *Primary Examiner.*

E. J. EARLS, *Assistant Examiner.*